(12) United States Patent
Moghe (10) Patent No.: US 11,308,114 B1
(45) Date of Patent: Apr. 19, 2022

(54) PLATFORM FOR PROVISIONING A DATA ANALYTICS ENVIRONMENT

(71) Applicant: Cazena, Inc., Acton, MA (US)

(72) Inventor: Pratyush Moghe, Acton, MA (US)

(73) Assignee: Cazena, Inc., Waltham, MA (US)

( * ) Notice: Subject to any disclaimer, the term of this patent is extended or adjusted under 35 U.S.C. 154(b) by 0 days.

(21) Appl. No.: 14/581,188

(22) Filed: Dec. 23, 2014

Related U.S. Application Data (60) Provisional application No. 61/920,240, filed on Dec. 23, 2013.

(51) Int. Cl.
*G06F 16/00* (2019.01)
*G06F 16/25* (2019.01)
*H04L 67/1008* (2022.01)
*H04L 67/53* (2022.01)

(52) U.S. Cl.
CPC ........ *G06F 16/254* (2019.01); *H04L 67/1008* (2013.01); *H04L 67/20* (2013.01)

(58) Field of Classification Search
CPC ........... G06F 17/00; G06F 17/30; G06F 16/00
See application file for complete search history.

(56) References Cited

U.S. PATENT DOCUMENTS

| | | | | |
|---|---|---|---|---|
| 4,929,939 A | * | 5/1990 | Varma | G06F 15/17375 340/2.24 |
| 5,319,347 A | * | 6/1994 | McClure | G06F 7/026 327/77 |
| 8,495,611 B2 | * | 7/2013 | McCarthy | H04L 41/0806 717/169 |
| 9,137,106 B2 | * | 9/2015 | McCarthy | G06F 9/5072 |
| 9,159,420 B1 | * | 10/2015 | Wohlgemuth | G11C 15/04 |

(Continued)

OTHER PUBLICATIONS

Armbrust, Michael, Armando Fox, Rean Griffith, Anthony D. Joseph, Randy Katz, Andy Konwinski, Gunho Lee et al. "A view of cloud computing." Communications of the ACM 53, No. 4 (2010): 50-58.*

(Continued)

*Primary Examiner* — Farhan M Syed
(74) *Attorney, Agent, or Firm* — David H. Judson (57) ABSTRACT

A services platform acts as an intermediary between an existing enterprise analytic environment, and one or more underlying cloud service providers. The platform provides enterprise "big data-as-a-service," by which an enterprise can seamlessly and easily provision new capacity for processing its analytic workload, and migrate data sources (e.g., data warehouse marts, enterprise data warehouses, analytic sandboxes, and the like) to the cloud for processing. The platform provides end-to-end enterprise class manageability of enterprise data assets, from data collection, aggregation, movement, staging and processing, all while providing service levels, security, access and governance. The platform integrates directly but seamlessly into the enterprise analytic stack, and existing analytics applications work as normal. The lifecycle of data analytics from movement to warehousing, however, is provided by the platform. The platform provides a way for the enterprise to translate its workloads into clusters of compute resources that meet its service level requirements.

20 Claims, 7 Drawing Sheets

(56) References Cited

U.S. PATENT DOCUMENTS

| | | | | |
|---|---|---|---|---|
| 9,207,976 B2* | 12/2015 | French | | G06F 9/45533 |
| 9,264,357 B2* | 2/2016 | Wang | | H04L 45/745 |
| 9,269,439 B1* | 2/2016 | Levy | | G11C 15/00 |
| 9,319,336 B2* | 4/2016 | Thakkar | | H04L 47/50 |
| 9,379,963 B2* | 6/2016 | Tran | | H04L 45/74 |
| 9,578,088 B2* | 2/2017 | Nickolov | | H04L 67/10 |
| 10,235,439 B2* | 3/2019 | Sullivan | | G06F 16/254 |
| 10,250,451 B1* | 4/2019 | Moghe | | H04L 41/14 |
| 2002/0009076 A1* | 1/2002 | Engbersen | | H04L 45/7457 |
| | | | | 370/389 |
| 2011/0191361 A1 | 8/2011 | Gupta et al. | | |
| 2012/0109774 A1 | 5/2012 | Chernenko et al. | | |
| 2012/0109947 A1 | 5/2012 | Yu et al. | | |
| 2012/0331050 A1 | 12/2012 | Wilbur et al. | | |
| 2013/0124807 A1* | 5/2013 | Nielsen | | G06F 11/1438 |
| | | | | 711/162 |
| 2013/0282798 A1* | 10/2013 | McCarthy | | G06F 8/61 |
| | | | | 709/203 |
| 2014/0040343 A1* | 2/2014 | Nickolov | | H04L 67/1029 |
| | | | | 709/201 |
| 2014/0241353 A1* | 8/2014 | Zhang | | H04L 45/74 |
| | | | | 370/390 |
| 2014/0279201 A1* | 9/2014 | Iyoob | | G06F 9/5077 |
| | | | | 705/26.7 |
| 2014/0321467 A1* | 10/2014 | Wang | | H04L 45/745 |
| | | | | 370/392 |
| 2014/0369363 A1* | 12/2014 | Hutchison | | H04L 45/745 |
| | | | | 370/474 |
| 2015/0052516 A1* | 2/2015 | French | | G06F 9/5083 |
| | | | | 718/1 |
| 2015/0134733 A1* | 5/2015 | Maturana | | H04L 67/1097 |
| | | | | 709/203 |
| 2015/0156288 A1* | 6/2015 | Lu | | H04L 69/22 |
| | | | | 370/392 |
| 2015/0186143 A1* | 7/2015 | Tran | | G06F 9/30145 |
| | | | | 712/225 |
| 2015/0186516 A1* | 7/2015 | Tran | | H04L 45/74 |
| | | | | 707/706 |
| 2015/0347542 A1* | 12/2015 | Sullivan | | G06F 16/254 |
| | | | | 707/602 |
| 2016/0063191 A1* | 3/2016 | Vesto | | G16H 50/50 |
| | | | | 705/2 |
| 2016/0197852 A1* | 7/2016 | Hutchison | | H04L 49/109 |
| | | | | 370/392 |
| 2016/0277295 A1* | 9/2016 | Tran | | H04L 45/74 |

OTHER PUBLICATIONS

Villars, Richard L., Carl W. Olofson, and Matthew Eastwood. "Big data: What it is and why you should care." White Paper, IDC (2011): 14.*

Ji, Changqing, Yu Li, Wenming Qiu, Uchechukwu Awada, and Keqiu Li. "Big data processing in cloud computing environments." In Pervasive Systems, Algorithms and Networks (ISPAN), 2012 12th International Symposium on, pp. 17-23. IEEE, 2012.*

\* cited by examiner

PLATFORM FOR PROVISIONING A DATA ANALYTICS ENVIRONMENT

BACKGROUND OF THE INVENTION

Technical Field

This disclosure relates generally to data analytics and, in particular, to a services platform upon which enterprises may execute their data analytic workloads in a secure and cost-efficient manner.

Background of the Related Art

"Big Data" refers to collections of data sets that are too large and complex for processing (e.g., analysis and visualization) using conventional database management tools or traditional data processing applications. On-premise "big data" analytic environments typically are predicated on enterprises "developing" or purchasing complete analytic infrastructure, whether via software, hardware (storage, compute, networking), or appliances. Subsequently, this infrastructure has to be deployed, maintained, and extended, requiring further significant investments and time delay. This dependence "slows" down the agility of the enterprises. Simple new projects for exploring analytics of newly procured data can take months if not longer.

Classic cloud analytic environments (such as Amazon® AWS, Rackspace® and others) provide the enterprise an alternative to on-premises analytics and, in particular, by offering infrastructure to deploy clusters for analytics. These cloud environments, however, typically are too complex for larger enterprises to understand, interact, provision, and manage. In particular, such environments are designed for "self-serve" IT in smaller companies, or companies that have already built their businesses in the cloud. To use these solutions, an end user typically has to manually pick piece parts of type of nodes, number of nodes, the type of database distribution, and the like, possibly without a good understanding of how such selections impact performance. Also, it is difficult for an end user to estimate the overall cost of the cloud infrastructure, because most of the costing is based on per hour type-pricing. The type of expertise that is required to manage the complexity (lifecycle of data, analytic workload translation, service level agreements, and the like) required for analytic type processing may not be available to larger enterprises, especially those that are new to the cloud. Indeed, the "threshold" of delivery is different for environments in which those enterprises typically operate—they are typically much less stringent in terms of performance/price service level agreements. Classic cloud environments, in contrast, are much more complex to scale up to large enterprise needs. Large enterprises typically do not "think" about their processing requirements in "cloud" terms of individual "nodes" or clusters but, rather, of the entire application including data, software, and the analytic workload.

A further complication to transitioning on-premises analytic processing to the cloud is the difficulty in moving enterprise data to the cloud, and doing so in a secure and cost-effective manner.

BRIEF SUMMARY

To address these problems, a services platform acts as an intermediary between an existing enterprise analytic environment, and one or more underlying cloud service providers. The platform provides an enterprise "big data-as-a-service" ("EBDaaS"), by which an enterprise can seamlessly and easily provision new capacity for processing its analytic workload, and migrate data sources (e.g., data warehouse marts, enterprise data warehouses, analytic sandboxes, and the like) to the cloud for processing. The platform provides end-to-end (life-cycle) enterprise class manageability of the enterprise data assets, from data collection, aggregation, movement, staging and processing, all while provide service levels, security, access and governance.

The platform is located between the enterprise and one or more cloud service providers that provide cloud compute resources. The platform provides a user console for provisioning and managing. Using the console, an end user (e.g., an enterprise administrator) creates a customer account and captures a basic set of information (e.g., type of data to be moved, volume of data, type of workload engine, a required service level, etc.) for the analytics workload to be processed. Based on the information provisioned in the user console, the platform executes a resource provisioning mechanism that automatically instantiates a "data cloud" within or across the third party cloud compute resources. From the user's perspective, the data cloud is instantiated transparently, as the end user does not need to interact directly with the cloud service provider(s) or have any knowledge about those resources. Preferably, the data cloud comprises a cloud layer (e.g., storage, compute nodes, networking, and other cloud resources) to support the workload, together with provisioning of one or more workload engines (e.g., databases) into which the enterprise data will be moved. Once the data cloud is instantiated, a set of one or more data movers collects and moves data from particular enterprise data sources into the data cloud. A data mover can move the enterprise as a one-time operation, on a streaming basis, or on some scheduled basis. The enterprise data is transported securely and via a specialized delivery protocol that ensures reliability and high-performance. Following instantiation of the data cloud and movement of the enterprise data into the workload engine, an analytics application workload is executed against the enterprise data. For example, if the analytics application is a business intelligence reporting tool, the tool is pointed to the data cloud. The tool then generates queries against the enterprise data in the data cloud, and (in lieu of executing in the enterprise environment) these queries execute in the data cloud as the workload.

In this manner, the platform integrates directly but seamlessly into the enterprise analytic stack, and existing analytics applications work as normal. The lifecycle of data analytics from movement to warehousing, however, is provided by the platform. The platform provides a way for the enterprise to translate its workloads into clusters of compute resources that meet its service level requirements at reasonable cost.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

The big data "as-a-service" platform of this disclosure preferably operates in association with, on the one hand, an enterprise analytics data infrastructure, and, on the other hand, a cloud computing infrastructure. A "customer" or "user" of the platform typically is an enterprise that desires to execute an analytics application "workload" against a set of enterprise data. Typically, the enterprise data comprises one or more data sources, and the notion of "enterprise data" is not necessarily limited to data that is actually sourced from the enterprise. The service platform of this disclosure acts as an intermediary between the enterprise analytics data infrastructure (which, typically, is "on-premises") and the underlying cloud compute resources that are to be provisioned and utilized by the enterprise for executing the workload. Typically, a "workload" as used herein refers to the operations that are performed by the analytics applications with respect to the enterprise data. According to this disclosure, that "workload" gets executed in the "cloud," but in a seamless and efficient manner. In this way, both the enterprise data itself and the analytics operations on that data are off-loaded to the cloud, but in a manner that provides the enterprise customer with only the amount of "resources" needed for the workload, and in a reliable and cost-effective manner.

As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof.

According to this disclosure, the services platform described may itself be part of the cloud compute infrastructure, or it may operate as a standalone service that executes in association with third party cloud compute services, such as Amazon® AWS, Microsoft® Azure, IBM® SoftLayer®, and others.

In the context of this disclosure, typically the enterprise analytics infrastructure is a standard analytic stack data flow comprising one or more data warehouses or data marts, ETL processes, workload engines (e.g., databases such as Hadoop, MPP SQL, Search or Spark), and analytics applications, such as business intelligence tools, advanced analytics tools, and the like. As is well known, a data warehouse, sometimes referred to an enterprise data warehouse (EDW), is a system used for reporting and data analysis. Data warehouses are central repositories of integrated data from one or more disparate sources. Typically, they store current and historical data. A data mart is a type of data warehouse that is focused on a single subject or functional area. Data marts usually draw data from only a few sources, such as internal operational systems, a central data warehouse, or external data. An extract-transform-load (ETL) process provides staging, data integration, and access layers. The staging layer stores raw data extracted from each of the disparate source data systems. The integration layer integrates the disparate data sets by transforming the data from the staging layer. The integrated data are then moved to the data warehouse database, where the data is arranged, typically into hierarchical groups. The access layer helps users retrieve data. The particular details of the enterprise data analytics layer is not a limitation of this disclosure, as the services platform is designed to operate with any type of components that may comprise the enterprise data analytics environment.

In particular, and as will be described, multiple enterprise customers use the services platform to offload data analytics workloads to "data clouds" that are intelligently provisioned and managed by the services platform. Each customer's workload may be executed in the cloud securely and privately, and in a manner that, for a given customer, meets a service level objective and cost.

Figure 1:
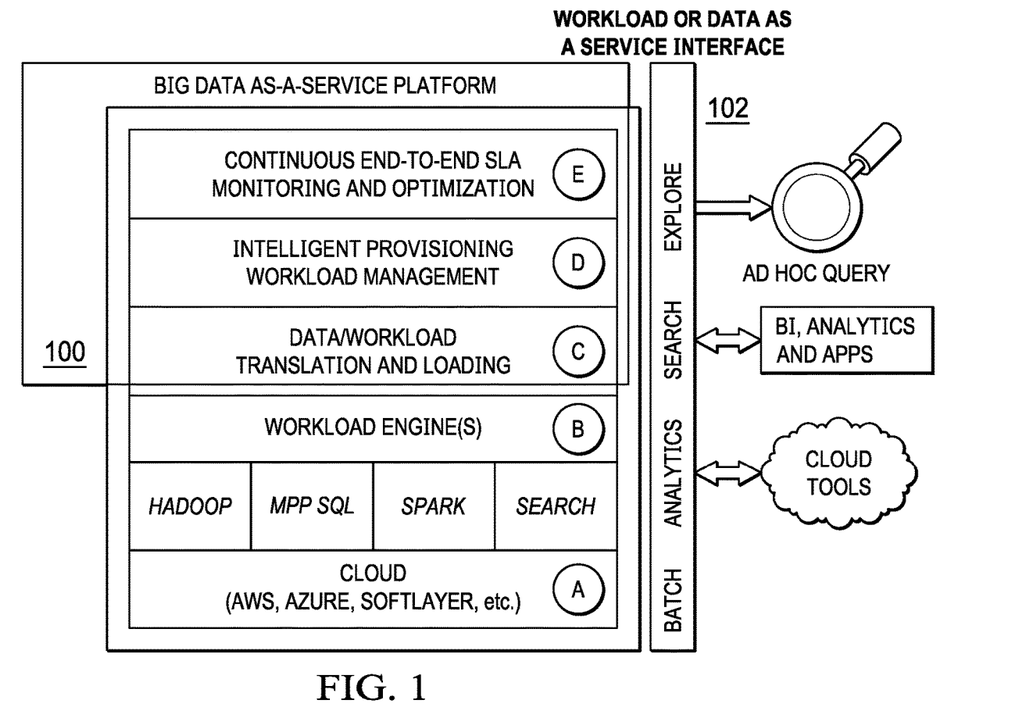
FIG. 1 depicts an exemplary block diagram of a distributed data processing environment in which exemplary aspects of the illustrative embodiments may be implemented.

FIG. 1 illustrates how the services platform 100 of this disclosure functions as an intermediary between the enterprise and the cloud compute infrastructure. As seen in FIG. 1, layer A represents that underlying cloud compute resources on which the data analytics application commands are executed against one or more workload engines, which are represented as layer B. The compute cloud and the workload engines are not necessarily part of the services platform but they are accessible thereby. The services platform 100 typically comprises Layers C, D and E.

Layer D (Intelligent Provisioning/Workload Management) provides the basic resource provisioning of the underlying compute cloud infrastructure, which includes the "data warehouse environment" including storage, compute nodes, networking, as well as the specific workload engine (a database, for example, a Hadoop distribution with specific configuration), which often is available from the cloud provider. As used herein, a workload engine refers to a database or data processing engine, such as (without limitation) those based on SQL, Hadoop, NoSQL, and others. Preferably, provisioning is done based on static information provided by the enterprise, or based on a "profiler" that profiles a specific workload and derives "optimal" provisioning based on cost, utilization and SLA requirements for the unique characteristics of the workload. This type of optimal provisioning ensures adequate workload performance at the lowest cost cloud footprint. As will be described, the resource provisioning is instantiated from a simple user interface console using a small set of basic inputs.

In general, the provisioning layer optimally provisions resources in the cloud by matching workload resource requirements to resource bundling options available in the cloud. To this end, the layer includes a workload profiler that accepts historical workload information comprising, for example, a plurality of database log files, application log files, and query system views, along with actual and projected workloads. It uses this information to produce a description of the workload resource requirements. A provisioning optimizer accepts the profiled workload resource requirements, along with service level agreements and cost requirements, and descriptions of the resource bundling options available in the cloud, and calculates the optimal cloud provisioning. This optimal cloud provisioning typically is a subset of the available cloud compute resources, and it may include an identification of one or more workload engines (e.g., databases) that will store the data and against which a workload (a set of commands from an analytics application, a set of search queries, etc.) will be executed.

In one embodiment, the historical log files and databases comprise descriptions of specific database queries, such descriptions comprising an identifier and text of a database query, the time the query was submitted and the time it completed, an execution plan for the query comprising a number of database operations, the estimated and actual costs and resources required for each database operation in the execution plan. The historical log files and databases may also comprise aggregated information about queries submitted over a period of time, such aggregated information comprising the number and total amount of time and total resources used by all queries over the period of time, grouped by type of resource and by database operation. By way of example, this aggregated information may indicate the total number of sequential disk scan operations across all queries over a period of time, along with the total number of bytes scanned, and the total time required to do the scanning.

In one embodiment, the service level agreements comprise a plurality of performance specifications. A performance specification may indicate a scheduling requirement as the time at which a particular workload is to complete. A performance specification may indicate a latency requirement as a percentage of cases in which a workload is to complete within a given amount of time after it is submitted. A performance specification may indicate a throughput requirement as the number and type of workloads to be completed within a period of time. With each specification in the service level agreements, there is a cost associated with failure to satisfy the condition. These costs may be arbitrary functions of both the size and the duration of the failure.

In one embodiment, the resource bundling options available in the cloud are derived by accessing public APIs provided by commercial cloud vendors and stored in database tables, whose columns indicate a cloud vendor, a locale, a resource-bundling-name, and a description of the types and amounts of resources provided in the bundling option. Said resources comprise compute resources, memory resources, disk resources and network resources. Said compute resources comprise number of cores, cycle time (GHz) and operations per second, processor type and instruction set (such as GPU/CUDA or CPU/ix86 or FPU). Said memory resources comprise memory level (L1 cache, L2 cache, L3 cache, general memory), #bytes-per-level, time to move data from memory level to processing unit. Said disk resources include type (SSD, magnetic disk), capacity in byte, read seek time, write seek time, #bytes/sec for reads and writes, IOPS. Said network resources comprise network type, #bytes/sec.

In one embodiment, the optimal cloud provisioning comprises a list of available provisioning options, ordered from best to worst, where each option comprises a workload description, a cloud provider, cloud locale, a number and type of virtual computational nodes, and a number and type of storage options. The term "optimal" is not intended to be limiting. The workload description comprises any or all of the workloads. The cloud provider may be a commercial vendor or a private on-premise cloud. The cloud locale describes the geographical region in which the cloud is to be provisioned. The type of virtual computational is a specific bundling of computational resources; and a storage option is a specific bundling of storage capacity and performance. In an embodiment supporting elasticity, the provisioning options further comprise range information describing the minimum, maximum and average number of virtual computational nodes of given types, along with the standard deviation.

Layer E (Continuous SLA Monitoring and Optimization) ensures that the cloud compute resources are optimized, for example, based on an actual delivery of an SLA and cost over a certain period of time. This layer includes functionality that computes the utilization and SLA for workloads, for example, over daily, weekly, monthly windows.

Based on one or more rule-based triggers, the optimization layer can alert or create reports if there is persistent under-allocation or over-allocation of resources. When this happens, Layer E can allocate a specific "re-provisioning time window," where the system resources are dynamically altered. Alteration as used herein may refer to an increase or decrease in the number of nodes provisioned based on the observed rules, altering specific "type" of nodes to increase or decrease performance based on specific I/O, compute or memory characteristics, altering the specific location of the processing (regions) to reduce latency and contention, or shifting the workload to an alternative cloud provider (e.g., if there is a persistent issue tied to the current provider).

Layer C (Data Translation and Loading) ensures that the enterprise data is loaded in an optimal way into the right workload engine environment. The "loading" function typically is carried out by one or more "data movers" that are integrated into the enterprise environment or that work in conjunction therewith. In some cases, the enterprise data may need to go through translation (such as schema translation, conversion of keys, compression, and so forth) to the right environment. For example, moving data from SMP databases to MPP databases require steps in terms of schema mapping, sort and distribution keys. This layer takes care of the specific issues involved in moving data sources to targets (the workload engines themselves).

Access to the services platform 100 may be provided via an services interface 102 through which enterprise users may perform queries, execute workloads (typically search queries instituted from Business Intelligence tools, Advanced Analytics applications, etc.), and the like. The service interface 102 may be implemented as a manual CLI or GUI-based interface, an application programming interface (API), or some other such mechanism.

Figure 2:
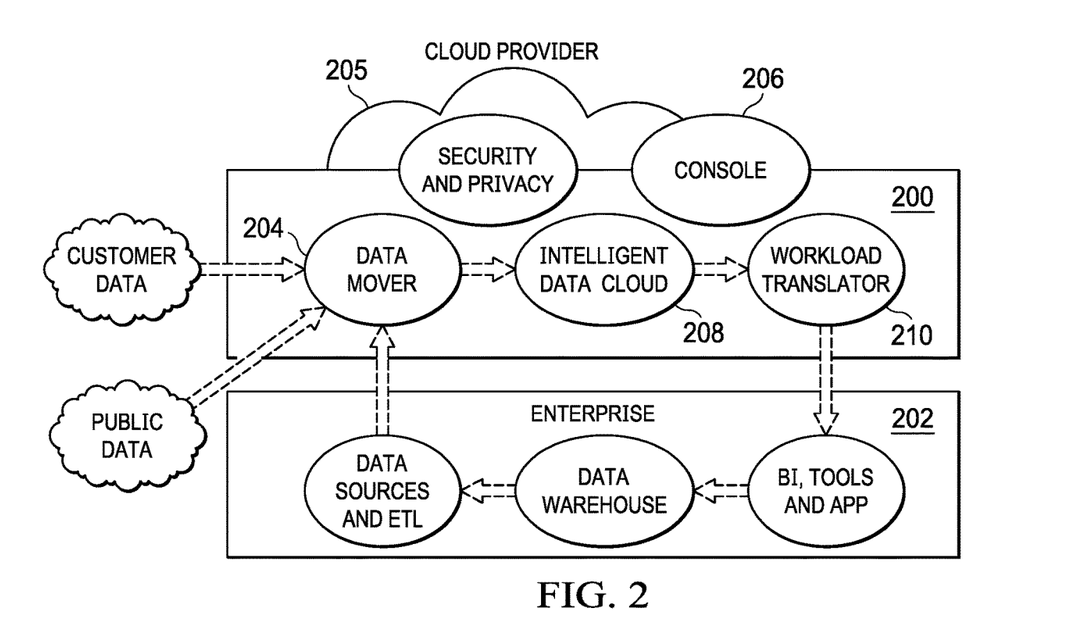
FIG. 2 illustrates how the services platform of this disclosure provides an overlay on an enterprise data analytics layer.

FIG. 2 illustrates the services platform 200 positioned as an "overlay" on the enterprise data analytics infrastructure 202. As noted, the enterprise analytic stack data flow includes the ETL, data warehousing, EDW, and BI/advanced analytic tools. The enterprise infrastructure also may comprise log and unstructured data aggregation, Hadoop processing, other analytic processing tools, and the like. Block 202 shows one specific cloud provider and its cloud offerings (such as compute nodes, storage nodes, and the like). The service platform, as noted, is architected to support multiple cloud providers, only one of which is shown in FIG. 2.

As noted, the service includes a number of functional modules. The data mover functionality 204 provides automated life-cycle management of the enterprise data that needs to be exported to the services platform. As will be described, this functionality provides a flexible data collection tool (or tool set) that aggregates structured and unstructured data from a number of different enterprise data sources including, without limitation, ETL servers, files, logs, or databases or data warehouses. Data is collected based on specific rules and filters so that only required subset of data is collected. Preferably, a data mover component can incorporate data from existing collection agents such as flume or fluentd, or via other log ingest mechanisms. The data mover functionality may be implemented in software, in hardware-based appliance, in specialized server machines, or the like. Aggregated data either is moved to the cloud directly, or it can be staged (e.g., on a staging server/appliance) and then scheduled for delivery at the most efficient and optimal times. Preferably, a data mover provides one or more transformations, such as data compression, and data encryption. In particular, preferably all data that is collected is compressed using a variety of techniques best suited to the type of data. Preferably, the data is encrypted with standard enterprise-class standards. Optionally, the service provides a full end-to-end encrypted tunnel for support of analytics on encrypted data. Preferably, the enterprise data is moved into the cloud (and, in particular, into the workload engine(s)) via a specialized delivery protocol that ensures reliability and high-performance of delivery. A particular data mover may also leverage third party mechanisms, such as AWS Direct Connect, or any other delivery protocol that the cloud providers offer to the enterprises. Generally, and as described, a particular data mover supports streaming, scheduled or one-time data movement. In a preferred embodiment, and as will be described, a data mover is built to layer on top of existing cloud provider offerings (such as AWS S3 and others) so that it provides seamless big data movement with a few clicks. A particular data mover is instantiated and orchestrated by a user console 206.

The console 206 is a configuration tool or portal for the service. In one embodiment, the console is a display interface configured as a web-accessible tool, such as a set of TLS/SSL-secured web pages. A customer registers to use the service, and permitted users associated with the enterprise customer receive access credentials. Users may be authenticated and authorized to use the interface in any known manner. The console 206 provides the user experience, management and policy capabilities for the overall platform. The console 206 also exposes administration interfaces by which the service provider creates a customer account and instantiate a specific platform for the customer. This may involve the orchestration of a private cloud for the customer within the third party cloud compute infrastructure. Once the customer account is established, permitted users associated with the enterprise access and use the service. To this end, a given analytics application workload is processed using a simple user interface by which the user designates a simple data set, such as type of data to be moved, volume of data, type of workload engine, information about the analytic application, information regarding required SLA, or cost, etc. The enterprise customer preferably identifies the size of the workload using a simple and small set of generic categories (e.g., "small," "medium" or "large"), and identifies the enterprise data that will be subjected to the workload. The information provided by the user also indicates the one or more data sources from which the data will be obtained, as well as the "type" of the workload engine (e.g., Hadoop, MPP SQL, etc.). Based on this simple data set, the data cloud 208 (or "cluster") is created and made available to the enterprise user for workload processing In particular, the data cloud is instantiated based on the information captured by the console. As noted above, preferably the data cloud comprises the underlying cloud compute layer 202 (that does not get exposed to the user), as well as support for the workload engines (Layers A and B in FIG. 1). As noted above, preferably the provisioning of the data cloud 208 is done based on static information provided by the enterprise, or based on a "profiler" that profiles a specific workload and derives "optimal" provisioning based on cost, utilization and SLA requirements for the unique characteristics of the workload. The provisioning ensures adequate workload performance at a lowest cost cloud footprint.

The profiler and the resource-provisioning functionality greatly simplify the user experience and interface between the enterprise and the cloud. In the past, the end user interacted with the cloud directly and had to manually pick piece parts, such as type of nodes, number of nodes, specific type of database distribution, etc., often without a good understanding of how such selections impacted the overall performance. The provisioning capability in the platform simplifies the user interface for enterprises. Using the interface, the end user identifies a given service level (e.g., the processing of the workload needs to be processed "within X time") at a particular cost (e.g., $Y dollars per unit time). Based on these simple high level inputs and the other information in the user-configured data set, a profiler and resource provisioning function (FIG. 1, Layer D) optimally provisions the underlying cloud compute infrastructure without involving enterprise personnel into technical details. This provisioning typically is in the form of instructions that are provided by the platform to the underlying cloud compute infrastructure.

As also seen in FIG. 2, the services platform may provide a workload translator 210 to ensure that existing analytic tools (e.g., such as Business Intelligence, Advanced Analytics, etc.) that are deployed in the enterprise work seamlessly with the services platform. With the workload translator 210 in place, typically, such tools are just re-targeted to point to the services platform and do not need to be modified. A security and privacy layer 212 is operative to ensure that enterprise security and privacy policies are extended to the service platform. Preferably, the platform provides network and user-level AAA (access control, authentication, and authorization). Preferably, access control is role-based and extended from the enterprise directory, such as Active Directory or LDAP. Preferably, additional role segregation is supported. As previously noted, data security is provided via encryption of data, preferably during transit and at rest. Optional features include the ability of the enterprise to control and manage the keys independent of the cloud provider or the service platform administrators. The security and privacy layer also provides for secure logging, auditing and monitoring, including alerting on any system or data-level incident. The platform may also provide compliance reporting that allows enterprises to extend their compliance posture to the cloud environment.

Figure 3:
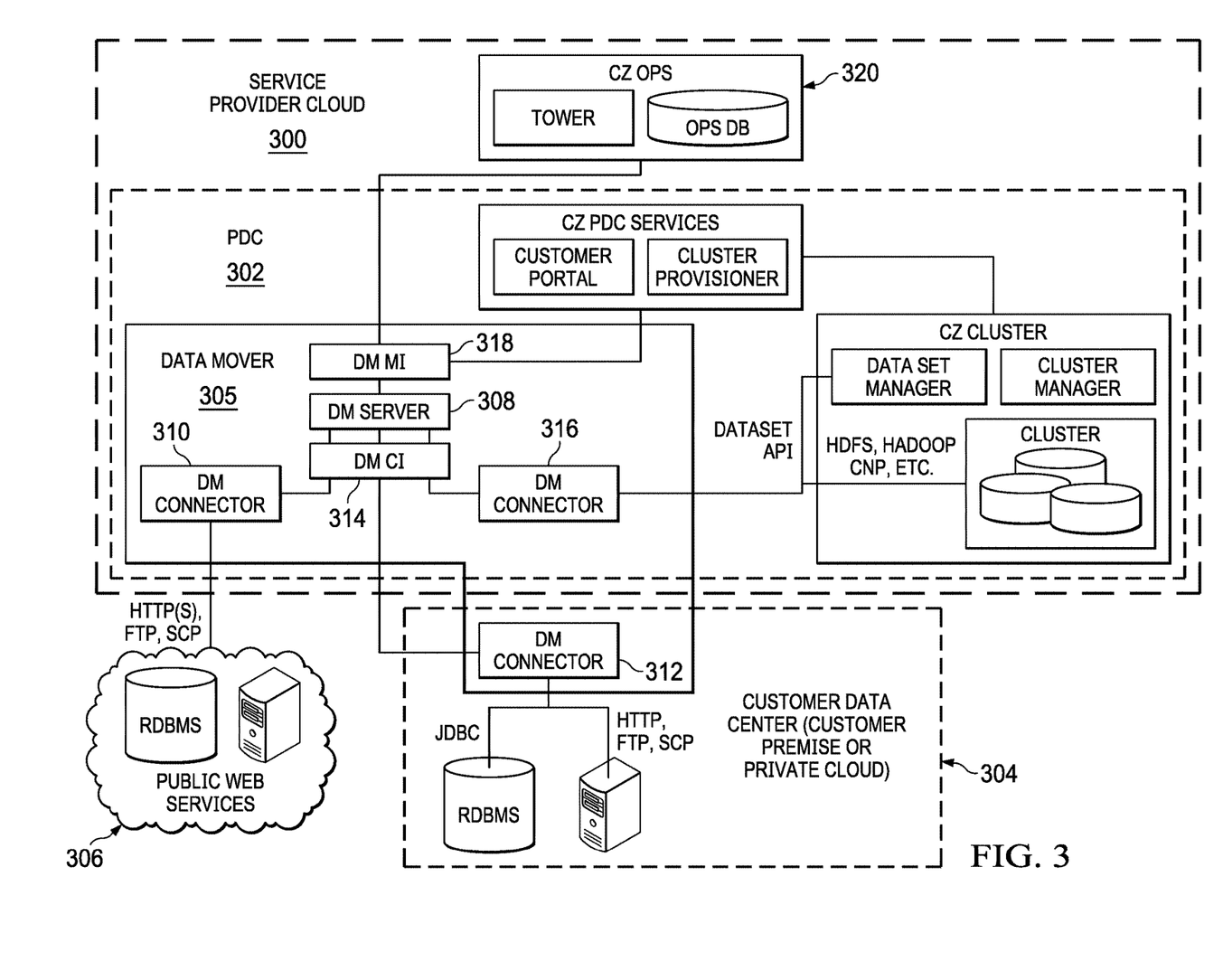
FIG. 3 depicts data mover architecture of the services platform.

FIG. 3 illustrates the data mover architecture in additional detail. In this embodiment, the services platform 300 includes one or more private data clouds (each a "PDC") 302 associated with a particular enterprise customer. The enterprise has an associated customer data center 304, typically located at the customer premises, or in a private cloud. As noted, the enterprise data center 304 supports the customer's analytics data flow. Data to be processed may also be provided from public web services 306. In this example, the data mover architecture comprises a number of functional components. Typically, a Data Mover (DM) 305 comprises a DM Server 308, and a set of associated DM Connectors 310. Each PDC 302 typically comprises one DM, and all DM components (for that DM) preferably are dedicated resources to the PDC. A DM 305 may move data between clusters within the same PDC but does not have access across PDCs. The DM Server 308 in the customer PDC controls data movement between enterprise data centers 304, public web services (like Twitter), and the data cluster in the service platform. As noted, preferably the customer data center (CDC) 304 is a secure, private network whether it is in the customer premise, a colocation hosting facility, or in a private cloud. Preferably, the DM Server 308 terminates secure connections from DM Connectors 310 and orchestrates data transfers between them. DM Connectors preferably are virtual appliances, which can be run internal or external to the PDC. A DM Connector 310 preferably is a logical entity that provides access to internal and external data stores. A DM Connector 310 is provisioned with the specific data type and schema for each of the data stores to which it provides access. A DM Server 308 coordinates data transfers between DM Connectors, which know the specifics of the data. Preferably, the DM Connectors also perform transformation of the data at the source, e.g., encryption, compression, normalization, anonymizing, filtering, and so forth.

A DM Connectors 312 may be remote. Remote DM connectors are virtual appliances instantiated in the customer data center (enterprise or private). Each remote DM Connector 312 connects securely to the DM Server 308 in the PDC via a Data Mover Connector Interface (DM CI) 314. As also shown, DM Connectors can also be instantiated within the PDC to connect to public web services 306. The interfaces are the same except that secure transport within the PDC is not required. As also shown, a DM connector 316 also may be internal. Internal DM connectors may be used for accessing the internal cloud datasets. Because the type of cloud data store may change (e.g., Hadoop, Elastic Search, Spark, or the like), preferably the DM Server is not tightly integrated with one type of storage. These internal DM connectors also support data movement between dissimilar clusters and thus facilitate different analytics.

A DM Management Interface (DM MI) 318 is a reference point between the DM Server and the Cloud PDC 302 and operational management services 320 provided by the service platform. The DM MI 318 preferably supports a set of network management protocols (SSH, REST, SCP, syslog, etc.) used to provision and monitor the DM Server and subordinate Connectors. DM Connectors may be accessed directly by the management services for troubleshooting; however, the normal path is through the DM Server. The DM Connector Interface (DM CI) 314 is a reference point between the DM Server and associated DM Connectors. The DM CI supports a set of protocols for security, network management, and data transfers. Security protocols (e.g. IPSec) are used to secure connections with external Data Connectors. Network management protocols (SSH, SCP, REST, Syslog, etc.) are used to provision, monitor, and control DM Connectors. Transport protocols (e.g. TCP, HTTP) are used to reliably transfer data between Connectors.

Figure 4:
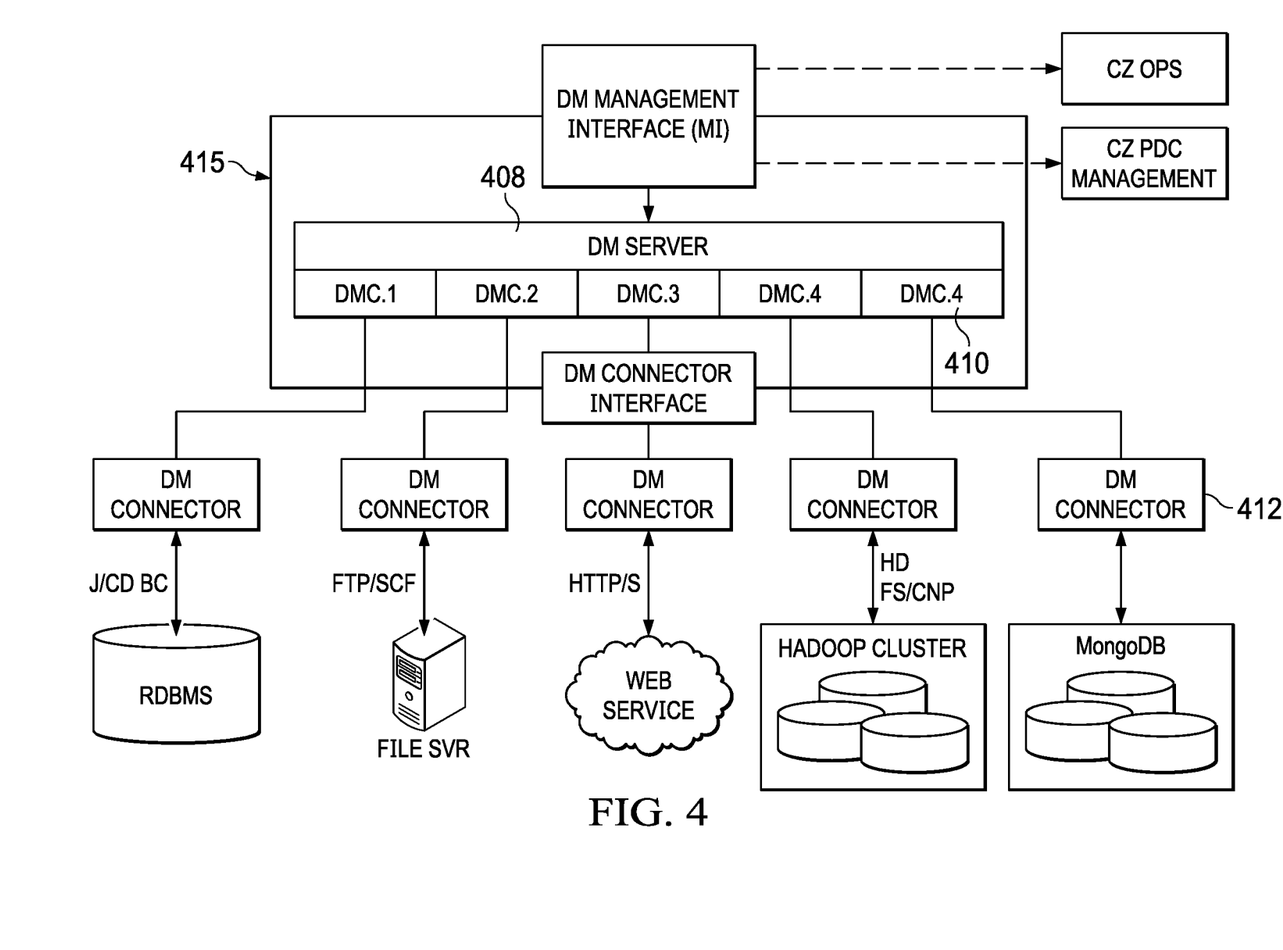
FIG. 4 illustrates a particular implementation of a data mover.

FIG. 4 illustrates a representative network topology for the data mover architecture in one non-limiting embodiment. Here, the DM Server 408 and its associated DM Connectors 410 are all IP connected such that they can be collocated on the same machine, collocated in the same data center, or remote across the Internet depending on network topology. For resource efficiency, preferably the DM Server and all local DM Connectors preferably are executed on a single, dedicated virtual machine instance (VMI) 415 in the PDC, although this is not a requirement. The size and capacity of the VM preferably is tunable depending on resource needs. In this embodiment, the DM Server and DM Connectors are packaged as Docker containers, deployable on the common base virtual machine instance. Docker images act as higher level packages, and they are described using the Dockerfile syntax. For portability to different customer environments, preferably the remote DM Connectors 412 are packaged as Virtual Appliances for VM Ware, KVM, VBox, or other virtual server environments. Preferably, remote DM Connectors 412 are designed to self-initialize and connect to the service platform cloud with little or no customer effort. In this way, the DM Connector automatically and securely connects to the DM Server in the service platform cloud without local management. Once connected, the DM Connector is fully managed through the customer portal.

Figure 5:
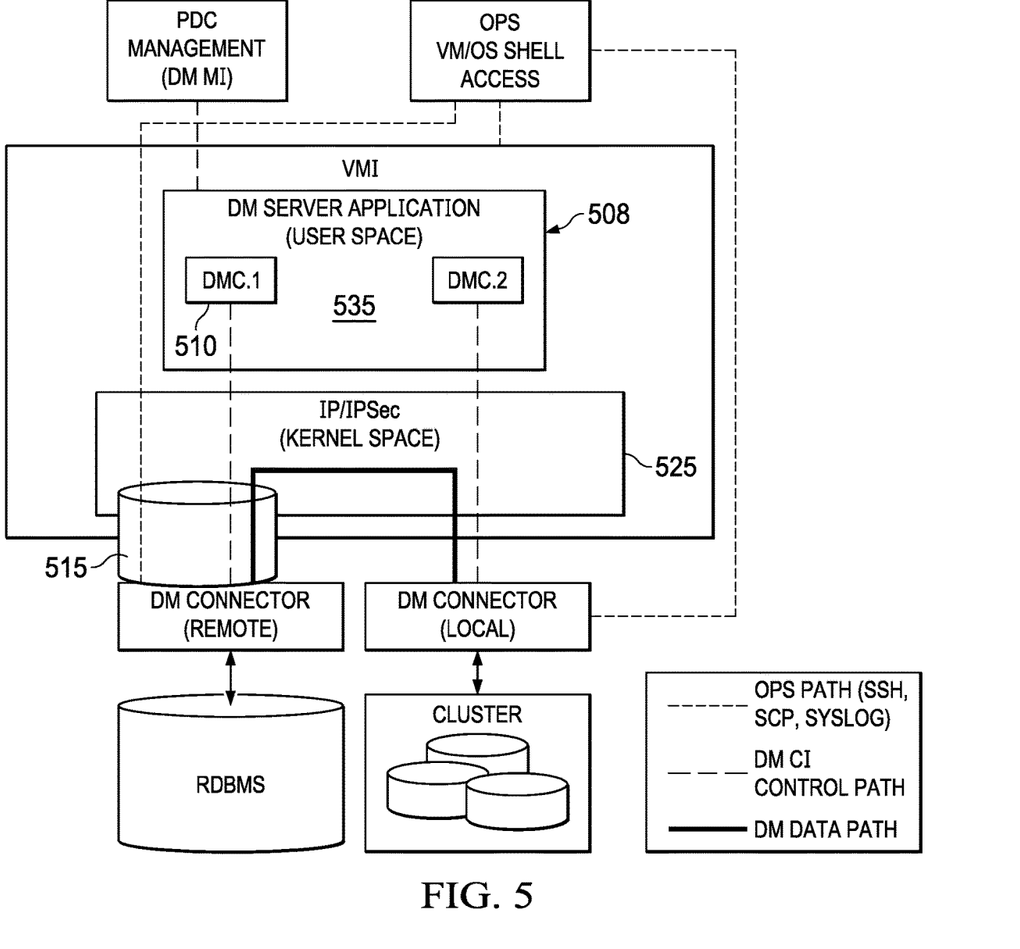
FIG. 5 illustrates traffic flow through the data mover.

FIG. 5 illustrates preferred traffic paths through the data mover. Preferably, and as described above, the DM Server 508 controls all data transfers between DM Connectors 510. The DM Server 508 preferably also contains a VPN server for terminating (through VPN tunnel 515) secure connections to remote DM Connectors 512. Therefore, the DM Server 508 the data path for transfers to/from remote DM Connectors. Preferably, the IP/IPSec data path 525 is entirely within the OS kernel, which is much more efficient. Traffic does not have to pass into user space 535 through the DM Server application. For transfers between local DM Connectors, the data path can go direct without involving the DM Server.

Preferably, the DM supports parallel, non-blocking data transfers, and multiple, independent transfers may be run simultaneously between different or common connectors. To accomplish this, the transfer process in the DM Connectors preferably run as separate CPU threads. Likewise, preferably requests are dispatched internally on separate threads so requests are non-blocking. Data transfers are end-to-end reliable from source to destination. A reliable TCP connection is established between DM Connectors, and the destination DM Connector preferably does not acknowledge data chuck transfers until successfully written to the destination data store. In the event of a temporary disconnect with a data store or between DM Connectors, the DM Connectors preferably retry the connection and gracefully continue with the transfer. If the disconnect persists, the DM Connector fails the job, notifies the platform, and cleans-up the incomplete transfer data. Preferably, recurring data transfers are treated as separate data transfers. For instance, a data transfer may be provisioned to import incremental relational database records every night. In this case, some may succeed and some may fail. Any failure status and notifications are provided to a management layer. If a workflow manager is used to schedule the actions, it can then retry or make decisions on the results.

Figure 6:
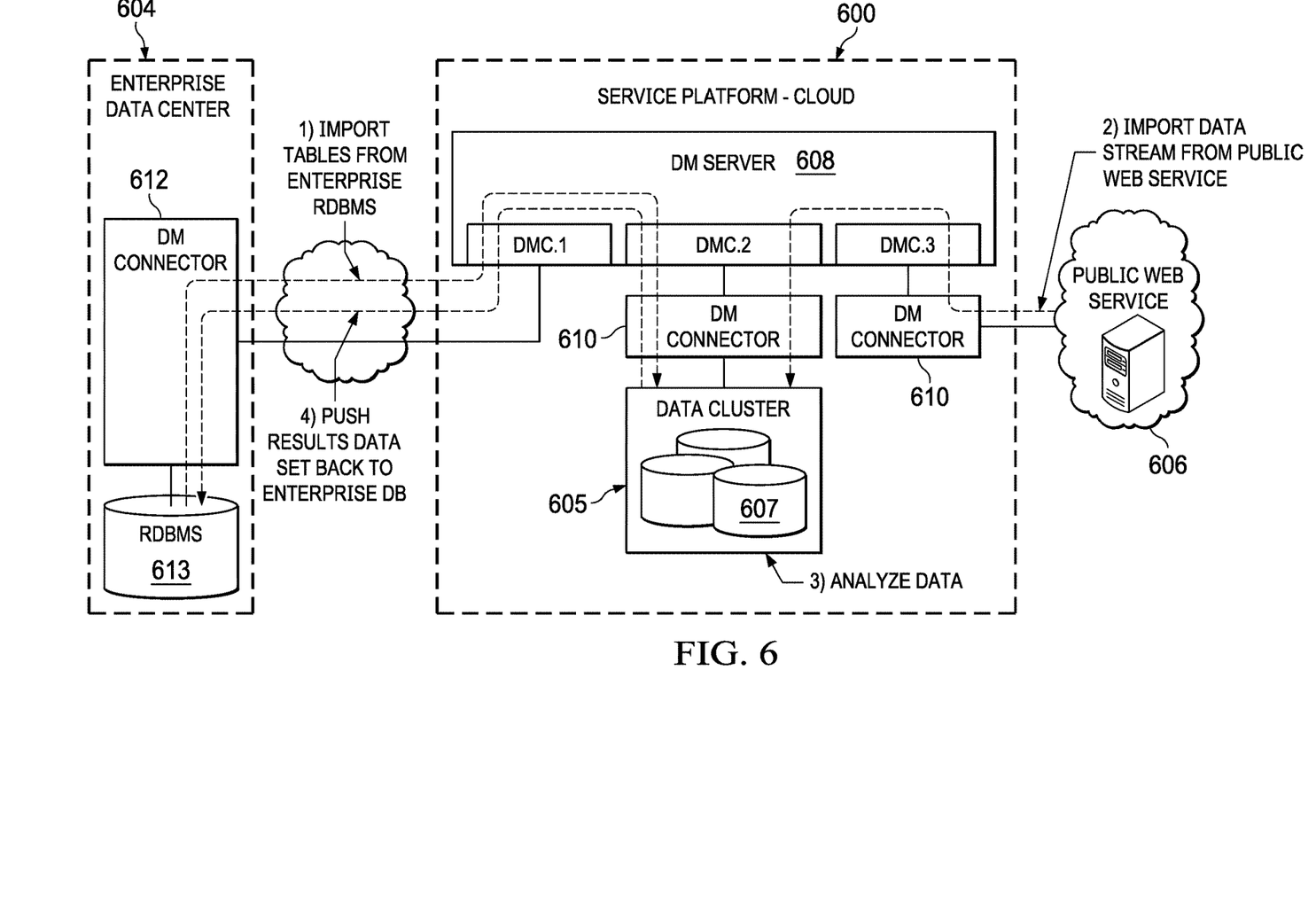
FIG. 6 illustrates how the service platform is used to perform big data analytics "as-a-service;"

FIG. 6 illustrates how the service platform 600 is used according to this disclosure. In this embodiment, analytics are normally performed on-premises in the enterprise data center 604. Here, the service platform 600 is configured using the console, as has been described. Accordingly, at step (1), enterprise data is imported via a data mover, as is separate public data from the public web service 606 at step (2). A workload engine 607 (e.g., a Hadoop database) is instantiated in the data cloud 605, and one or more queries (the "workload") are then executed against the data cloud. This is step (3) and corresponds to the data analysis. The results of the data analysis are then pushed back to the enterprise at step (4) to complete the process. In this example, the DM Server 608 sits in the customer's PDC 302. A remote DM Connector 612 is in the EDC 604 with access to the customer's RDBMS 613. A local DM Connector 610 is attached to the PDC data cloud 605, which is sometimes referred to herein as a "cluster." Another local DM Connector 610 feeds data streams from the public web services 606. As noted above, the process flow includes the database tables imported from the EDC RDBMS and written into the PDC cluster, and the data stream imported from a public web service and written into the PDC cluster. The analytics job is run and a result set is created on the cluster, and the result set is exported to the EDC RDBMS, preferably in a new table.

In FIG. 6, the workload (or "job") is executed against the configured data cloud cluster. In one embodiment, this operation involves simply pointing a front-end analytic tool (e.g., a Business Intelligence reporting tool such as Tableau, Microstrategy, or the like) to the cluster. The tool generates SQL queries that slice the data sets against a certain dimension and return results. These queries execute in the data cloud as the workload. As noted above, and if needed, the workload translator is provided to ensure that queries generated by the front-end analytic tool execute seamlessly on the workload engine in the data cloud. In an alternative embodiment, a scheduled batch processing job that has already been created on the enterprise database is moved from the enterprise database to the data cloud. One way to move it is to leverage the data mover to move and load an application file into the data cloud and schedule this file to run, e.g., via a workflow manager. The batch process then executes a set of Hive or SQL or Hadoop map reduce code on the already moved data in the data cloud.

Figure 7:
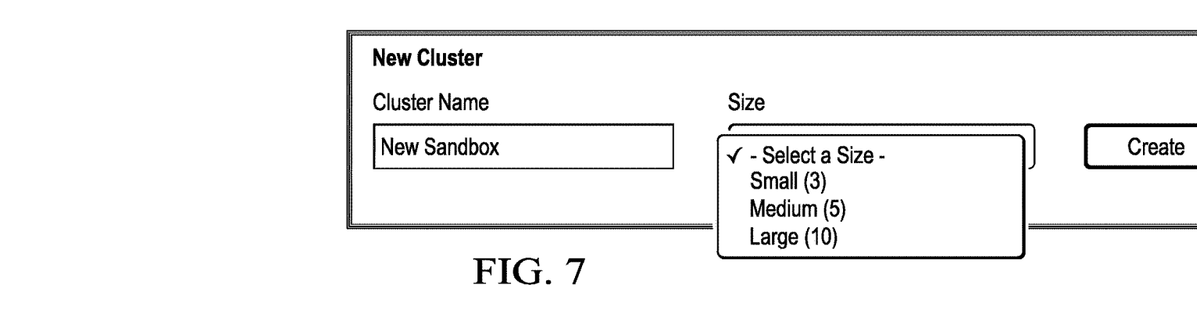
FIG. 7 illustrates a display interface by which an enterprise user configures an analytics cluster.
Figure 8:
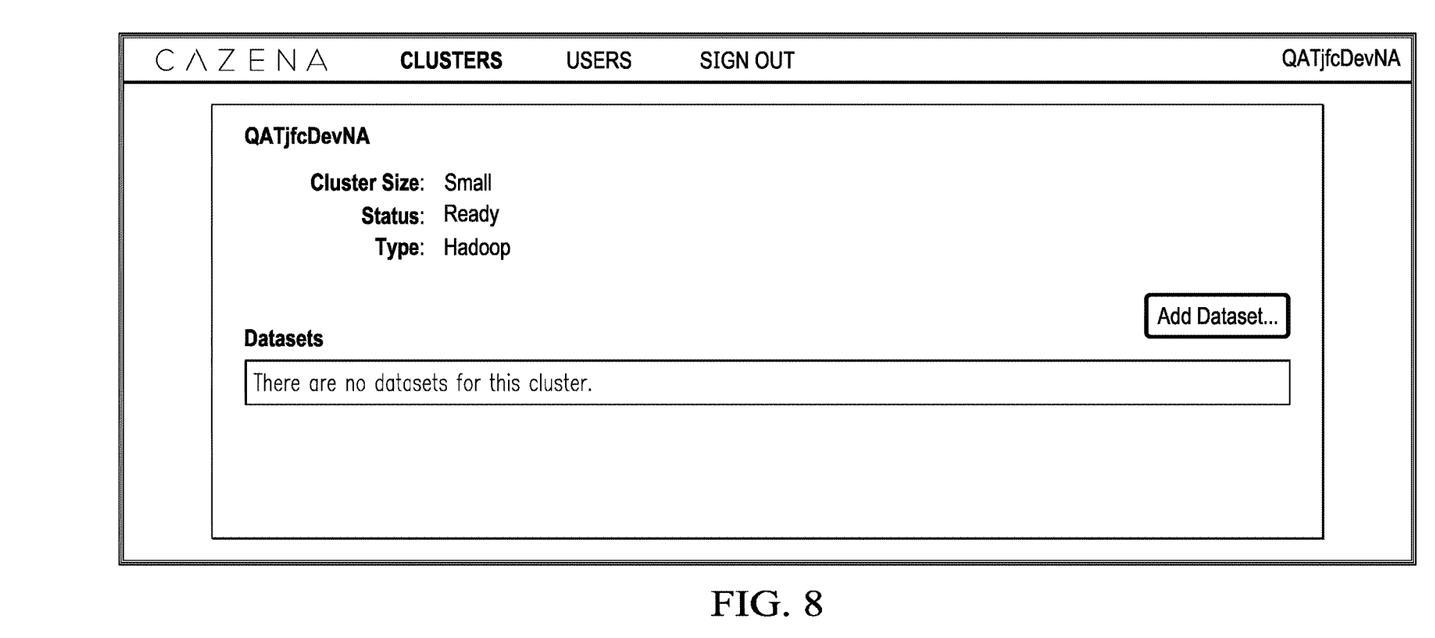
FIG. 8 illustrates a display interface panel by which an enterprise user can specify one or more data sources for the cluster.
Figure 9:
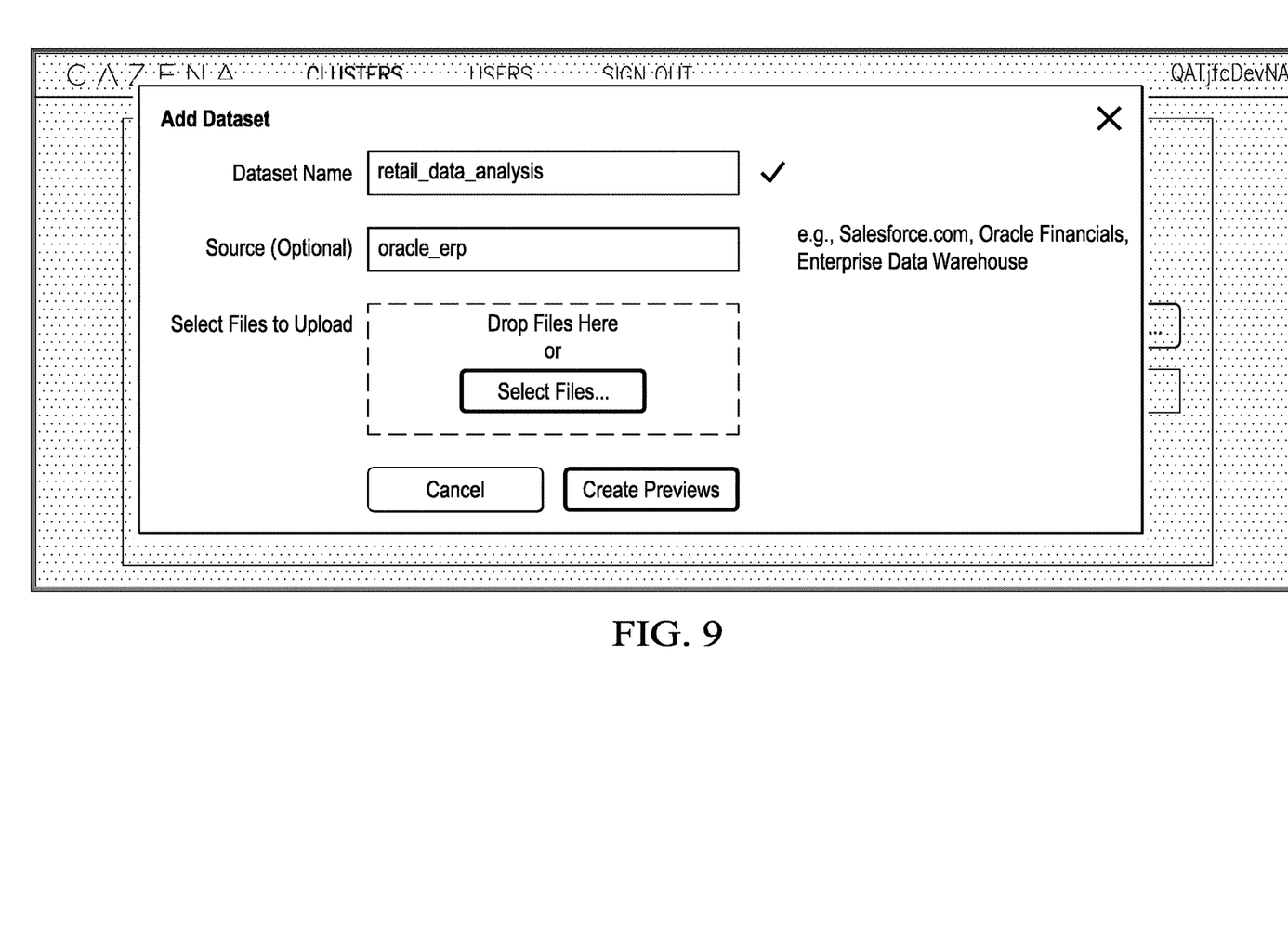
FIG. 9 illustrates how the user can drop and drag data sources into the cluster.

Preferably, the infrastructure and software on the services platform is provisioned automatically upon customer demand. As noted above, preferably the data cloud is instantiated with a few simple commands and using a basic display interface panel such as shown in FIG. 7. In this example, the user names the new cluster, and selects from a dropdown list of sizes (e.g., small, medium and large). The number of size categories and their designations may vary, but preferably there are only several "high level" choices that the user can select. Once the user names the cluster and identifies its size, he or she can then identify the data sources for the cluster, using the interface display shown in FIG. 8. Once the user selects the "Add Dataset" button, a drop and drag interface is exposed, such as shown in FIG. 9. Files or other data sources are then dropped or otherwise specified to instantiate the cluster and its associated workload engine, which has been specified in another interface panel (not shown). After the user finishes the configuration/provisioning of the cluster, the system generates instructions to instantiate the private data cloud.

Preferably, the services platform is offered and managed by a service provider. To this end, the provider obtains infrastructure (e.g., private networks, machine instances, storage etc.) from one or more Infrastructure as a Service (IaaS) providers, like Amazon and Rackspace. The service provider provisions infrastructure on the IaaS provider cloud by calling its REST APIs. Before a particular piece of software can be run on a set of machines, it must be downloaded and installed. Preferably, the services platform includes an orchestration subsystem to provision the enterprise data clouds (clusters), and a deployment subsystem to deploy software and other tooling into those clouds. Generally, the provisioning subsystem creates a customer-specific private data cloud by provisioning resources like VPCs, subnets, route tables, security groups, EBS volumes, AWS instances, etc. It then directs the deployment subsystem to install and configure appropriate software on the provisioned infrastructure. Without intending to be limiting, the provisioning components preferably expose their functionality as a set of REST APIs. The customer-specific private data cloud preferably comprises all the elements needed by a customer to monitor and provision clusters for different workloads.

The techniques herein provide many advantages. The services platform provides extreme agility to enterprises to provision new capacity for processing of analytic workloads. The approach provides for seamless extension, augmentation or migration of existing analytic process (that is, data warehouse marts, enterprise data warehouses, analytic sandboxes). The service platform integrates into existing analytic eco-systems (that is, ETL, and BI/Advanced analytics), so that existing tools that deliver or consume big data work seamlessly. The platform provides end-to-end enterprise-class manageability of the data assets, including full life-cycle issues, such as service level agreement, data collection, aggregation, movement, staging, processing, security, access and governance.

The solution provides for enterprise-class big data as a service based on a service platform that is focused on data warehousing and data analytics. Advantageously, this service is provided as an "intermediary" or an "overlay" service between enterprises and current cloud providers. The disclosed platform offers an end-to-end (preferably Hadoop-based) data warehousing service on the top of cloud providers, and the platform integrates directly into the enterprise analytic stack. Existing ETL and BI just continues to work seamlessly, as preferably the entire life cycle of data analytics from movement to warehousing is taken care of by the solution. The platform does not assume any specific Hadoop distribution, and it can work with a variety of vendors. Also while the preferred workload engine is based on Hadoop, this is not a limitation. Depending on the end application and target price/performance, the workload engine (or, more generally, the analytics target system) may be instantiated with any database or other memory-intensive compute frameworks. Likewise, for other applications that require NOSQL processing, other data processing or databases can be plugged into the platform directly.

The disclosed solution offers price/performance advantages, preferably with a stringent analytic SLA. The service carefully stitches together the right computing, networking and analytic fabric, along with optimal resource provisioning, monitoring and management of analytic jobs, to deliver superior price/performance and stringent SLA on analytics. Preferably, the solution does this as an overlay while deploying on top of known cloud providers (e.g., Amazon) and using proven enterprise Hadoop stacks (e.g., Cloudera, and others). The resulting platform is an analytic cloud provider with superior intelligence and control to deliver the highest level of user experience in the enterprise.

The platform interfaces with the enterprise customer in a simple-to-use and understand manner, and it hides the complications of the cloud by offering a simple service that is optimized around an enterprise's pricing budget and expected SLA.

Each of the above-described functions may be implemented in a hardware processor, as a set of one or more computer program instructions that are executed by the processor(s) and operative to provide the described function.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

The front-end of the above-described infrastructure (namely, the customer console or portal) is also representative of a web site (e.g., a set of one or more pages formatted according to a markup language). Interaction with the portal may also take place in an automated manner, or programmatically, and the portal may interoperate with other identity management devices and systems.

Typically, the cloud computing environment has a set of high level functional components that include a front end identity manager, a business support services (BSS) function component, an operational support services (OSS) function component, and the compute cloud components themselves.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

The techniques herein provide for improvements to another technology or technical field, namely, data analytics tooling, applications and systems, as well as improvements to cloud computing infrastructures that support such functions and technologies.

Having described my invention, what I now claim is as follows:

1. Apparatus to provision and execute an enterprise data analytics application, comprising:
   one or more hardware processors;
   computer memory holding computer program instructions executing in the one or more hardware processors, the computer program instructions operative to:
      receive from an enterprise user a data set defining a workload to be processed in a set of cloud compute resources, the data set comprising a type of data, a volume of data, one or more data sources from which the data is obtained, a service level requirement, and a workload engine type, wherein the volume of data identified in the data set is described by a selected one of a set of high-level workload sizing categories that are constrained in number, and wherein each of the high-level workload sizing categories differs from one another;
      receive one or more resource bundling options, wherein a resource bundling option is associated with a given public or private cloud and comprises availability information in the given public or private cloud of cloud compute resources that are one of: compute, memory, disk and network;
      in response to receiving the data set, provide instructions to instantiate a data cloud comprising a subset of the cloud compute resources, the subset being determined based at least in part on the high-level workload sizing category selected, the service level requirement, and the one or more resource bundling options, the data cloud including a workload engine as specified by the workload engine type, wherein implementation details regarding instantiation of the subset of the cloud compute resources are not exposed to the enterprise user;
      following instantiation of the data cloud, move enterprise data from the one or more data sources into the workload engine instantiated in the data cloud; and
      receive a set of one or more commands executed as a workload against the workload engine.

2. The apparatus as described in claim 1 wherein, based on the workload, the subset of cloud compute resources is instantiated to provide a given service level at a given cost.

3. The apparatus as described in claim 1 wherein the computer program instructions are further operative during the move to perform a transformation on the enterprise data.

4. The apparatus as described in claim 3 wherein the transformation is one of: compression and encryption.

5. The apparatus as described in claim 1 wherein the enterprise data is moved as a one-time operation, by streaming, or on a scheduled basis.

6. The apparatus as described in claim 1 wherein the instructions are provided to a cloud service provider.

7. The apparatus as described in claim 1 wherein the one or more data sources comprises one of: files, databases, and data streams.

8. The apparatus as described in claim 1 wherein the workload engine is a database.

9. The apparatus as described in claim 8 wherein the one or more commands are database queries to the workload engine.

10. The apparatus as described in claim 9 wherein the one or more commands are generated by the enterprise analytics application.

11. The apparatus as described in claim 10 wherein the enterprise analytics application is a business intelligence tool.

12. The apparatus as described in claim 10 wherein the computer program instructions are further operative to return to the enterprise results obtained from executing the one or more commands.

13. The apparatus as described in claim 1 wherein the computer program instructions are further operative to adjust the cloud compute resources as needed to ensure compliance with the service level requirement specified in the data set as the workload is processed in the data cloud.

14. The apparatus as described in claim 1 wherein the data cloud is a private data cloud associated with the enterprise and no other enterprise.

15. The apparatus as described in claim 1 wherein the high-level workload sizing categories are small, medium and large.

16. A data analytics service operative in association with a computing cloud infrastructure having a set of cloud compute resources, comprising:

for each of two or more participating enterprises, provisioning a private data cloud with the computing cloud infrastructure by (i) receiving from an enterprise user a data set defining a workload to be processed in a set of cloud compute resources, the data set comprising a type of data, a volume of data, one or more data sources from which the data is obtained, a service level requirement, and a workload engine type, wherein the volume of data is described by one of a selected set of high-level workload sizing categories that are constrained in number, wherein each of the high-level workload sizing categories differs from one another; (ii) receiving one or more resource bundling options, wherein a resource bundling option is associated with a given public or private cloud and comprises availability information in the given public or private cloud of cloud compute resources that are one of: compute, memory, disk and network: (iii) responsive to receiving the data set, providing instructions to instantiate the private data cloud comprising a subset of the cloud compute resources, the subset determined based at least in part on the high-level workload sizing category selected, the service level requirement, and the one or more resource bundling options, the data cloud including a workload engine as specified by the workload engine type, wherein implementation details regarding instantiation of the subset of the cloud compute resources are not exposed to the enterprise user; (iv) moving enterprise data from the one or more data sources into the workload engine instantiated in the data cloud; and (v) executing a workload against the workload engine;

wherein at least one of the operations is carried out in software executing in a hardware element.

17. The data analytics service as described in claim 16 wherein the private data cloud provides the participating enterprise a data analytics service at a defined service level and cost.

18. The data analytics service as described in claim 17 further including adjusting the cloud compute resources within a particular private data cloud as needed to ensure compliance with the service level requirement specified in the data set.

19. The data analytics service as described in claim 16 further including translating a workload query into a format compatible with the workload engine.

20. The data analytics service as described in claim 16 wherein the cloud computing infrastructure is provided by a third party.

* * * * *